US008625181B2

(12) United States Patent  
Holmes

(10) Patent No.: US 8,625,181 B2  
(45) Date of Patent: Jan. 7, 2014

(54) HOLOGRAPHIC SECURITY DEVICE HAVING DIFFRACTIVE IMAGE GENERATING STRUCTURES

(75) Inventor: Brian Holmes, Fleet (GB)

(73) Assignee: De La Rue International Limited, Basingstoke (GB)

( * ) Notice: Subject to any disclaimer, the term of this patent is extended or adjusted under 35 U.S.C. 154(b) by 619 days.

(21) Appl. No.: 12/451,094

(22) PCT Filed: Jun. 12, 2008

(86) PCT No.: PCT/GB2008/002013  
§ 371 (c)(1),  
(2), (4) Date: Mar. 4, 2010

(87) PCT Pub. No.: WO2008/152389  
PCT Pub. Date: Dec. 18, 2008

(65) Prior Publication Data  
US 2010/0172000 A1 Jul. 8, 2010

(30) Foreign Application Priority Data  
Jun. 13, 2007 (GB) .................................. 0711434.1

(51) Int. Cl.  
*G03H 1/00* (2006.01)

(52) U.S. Cl.  
USPC ...................... 359/2; 359/24; 359/32; 283/85

(58) Field of Classification Search  
None  
See application file for complete search history.

(56) References Cited

U.S. PATENT DOCUMENTS 4,421,380 A 12/1983 McGrew  
5,291,317 A 3/1994 Newswanger  
5,668,047 A 9/1997 Muroya  
5,784,200 A 7/1998 Modegi  
(Continued)

FOREIGN PATENT DOCUMENTS

AU B-53729/90 10/1991  
CA 2 533 094 A1 2/2005  
(Continued)

OTHER PUBLICATIONS

Drinkwater et al., "A new flexible origination technology based on electron beam lithography and its integration into security devices in combination with covert features based on DNA authentication," *Optical Security and Counterfeit Deterrence Techniques IV*, Rudolf L. van Renesse, editor, Proceedings of SPIE, vol. 4677, 2002, pp. 203-214.

(Continued)

*Primary Examiner* — Arnel C Lavarias  
(74) *Attorney, Agent, or Firm* — Oliff & Berridge, PLC

(57) ABSTRACT

A holographic security device including at least first and second diffractive image generating structures recorded in respective sets of substantially non-overlapping regions of a record medium, the regions of one set being interleaved with regions of the other set, whereby both interleaved regions are substantially non-visible to the unaided eye. The holographic security device generates two or more holographic images viewed from separate and/or overlapping viewing directions around the device and seen by tilting the device, and each particular holographic image in a viewing direction is generated by the diffractive image generating structure associated with one set of interleaved lines. The first diffractive image generating structure has been formed to have a diffuse diffractive replay and the second diffractive image generating structure has been formed to have a non-diffuse or specular diffractive replay.

47 Claims, 13 Drawing Sheets

Figure showing overlapping image switch between portrait and geometric star on left to right tilting.

Portrait = DOIC = Diffuse Optical Image component  
Star = SEIC = Specular electronic image component

(56) References Cited

U.S. PATENT DOCUMENTS

| | | | |
|---|---|---|---|
| 5,991,078 A | 11/1999 | Yoshitake et al. | |
| 6,359,734 B1 | 3/2002 | Staub et al. | |
| 6,876,473 B2* | 4/2005 | Drinkwater | 359/2 |
| 2005/0068625 A1 | 3/2005 | Schilling et al. | |
| 2005/0123134 A1 | 6/2005 | Alasia | |
| 2008/0094673 A1* | 4/2008 | Holmes | 359/2 |

FOREIGN PATENT DOCUMENTS

| | | |
|---|---|---|
| CA | 2 542 497 A1 | 5/2005 |
| CH | 690232 A5 | 6/2000 |
| DE | 297 00 289 UI | 8/1997 |
| DE | 10308328 A1 | 9/2004 |
| EP | 0105099 A1 | 4/1984 |
| EP | 0375833 A1 | 7/1990 |
| EP | 0769179 A1 | 4/1997 |
| EP | 0883085 A1 | 12/1998 |
| JP | A-2002-90548 | 3/2002 |
| JP | A-2002-250808 | 9/2002 |
| JP | A-2003-122234 | 4/2003 |
| WO | WO 91/03747 A1 | 3/1991 |
| WO | WO 92/04692 AI | 3/1992 |
| WO | WO 94/28444 A1 | 12/1994 |
| WO | WO 95/04948 | 2/1995 |
| WO | WO 97/19821 A1 | 6/1997 |
| WO | WO 99/17941 A1 | 4/1999 |
| WO | WO 99/47983 A1 | 9/1999 |
| WO | WO 99/59036 A1 | 11/1999 |
| WO | WO 02/48760 A1 | 6/2002 |
| WO | WO 03/009225 A2 | 1/2003 |
| WO | WO 03/055691 A1 | 7/2003 |
| WO | WO 2004/076197 A2 | 9/2004 |
| WO | WO 2005/009751 A2 | 2/2005 |
| WO | WO 2005/042268 A1 | 3/2005 |
| WO | WO 2005/038500 A1 | 4/2005 |
| WO | WO 2005/071444 A2 | 8/2005 |
| WO | WO 2006/061586 A2 | 6/2006 |
| WO | WO 2007/083140 A1 | 7/2007 |

OTHER PUBLICATIONS

Moser, "Document Protection by Optically Variable Graphics (Kinegram)," *Optical Security and Counterfeit Deterrence Techniques IV*, Rudolf L. van Renesse, editor, Chapter 9, 2002, pp. 169-185.

International Search Report issued for International Application No. PCT/GB2008/002013 on Nov. 24, 2008.

Anlages 1-2, 500 DZD note, 2013.

Anlage 3, enlargement of the security element of the 500 DZD note, 2013.

Cuhaj et al., "Standard Catalog of World Paper Money" 14$^{th}$ edition, pp. 43-49. 2008.

Armenian Banknote and sections of banknote, 2003.

Schilling et al., "Achromatic Features for Optically Variable Devices", pp. 238-246, SPIE vol. 4677, 2002.

Opposition to European counterpart application EP 2152526 B1, lodged May 24, 2012 by Giesecke & Devrient GmbH, Munich, Germany, with English translation.

Opposition to European counterpart application EP 2152526 B1, lodged Jun. 6, 2012, by Leonhard Kurz Stiftung & Co., Kg, with English translation.

* cited by examiner

Figure showing overlapping image switch between portrait and geometric star on left to right tilting.

Portrait = DOIC = Diffuse Optical image component
Star = SEIC = Specular electronic image component Figure showing overlapping image switch between portrait and expanding geometric star driven by left to right tilting of security device LV = Left View
LCV = Intermediate Left of Centre View
CV = Centred View
RCV = Intermediate Right of Centre View
RV = Right View

HOLOGRAPHIC SECURITY DEVICE HAVING DIFFRACTIVE IMAGE GENERATING STRUCTURES

BACKGROUND

Currently within the optical security industry there exists the dual pressures of creating optically variable designs and effects, which have a level of visual simplicity and uniqueness commensurate with the need for clear and unambiguous public recognition and verification, whilst being immune from simulation by the techniques and technologies accessible to organised crime. The particular focus of this invention is the class of optically variable devices wherein the optical effects are generated by the fundamental mechanism of diffraction (first or zero order) that occurs at an interface or surface on the device that is comprised of embossed surface relief. Devices operating through the first order of diffraction are known within the industry as DOVID's (Diffractive Optical Variable Image Device). The most sophisticated threat to the integrity of a high security DOVID is re-origination or reproduction by the uncontrolled origination technologies used to generate iridescent effects and optical imagery within the decorative foiling industry (e.g. low spec dot-matrix and interferential masking techniques).

As a result origination providers have made efforts to make more complex devices. Examples of this approach are described in WO99/59036 and WO2006061586 in which two holographic generating structures are provided, with regions of one structure being interleaved with regions of the other on a scale which is non-visible to the naked eye such that the two structures appear fully integrated. This produces a secure device with an enhanced and visually distinctive optically variable image switching effect which can be easily verified but which is very difficult to re-originate and counterfeit. However in these cases the two holographic generating structures are originated using the same techniques and both generate diffuse diffraction and therefore the optical effects of the two structures are similar. A limitation of such a device is that the visual contrast between the two optically variable image elements provided by respective holographic image generating structures, is limited solely to the difference in their graphical or pictorial form. If we consider a situation wherein the diffractive replay from each generating structure is subject to an additional common diffusing effect, then there is the possibility that this diffusion may be large enough to cause the two image components to overlap within the angular viewing zone i.e. the two images will be simultaneously visible. The lack of differentiation in optical terms between the two image components (they are both diffuse diffractive) is apt to cause confusion to the untrained authenticator to the extent that the two holographic generating structures may be effectively substituted or simulated by one image generating structure, thus compromising the security value of the device. The most typical source of additional diffusion will be a diffuse illuminating light source or multiple light sources—the worst scenario being that when the device is viewed externally in an overcast day when the illuminating sunlight light has been very diffusely scattered by clouds. Another source of diffusion occurs when the device has been applied by the process of hot stamping to heavily textured substrates such as banknote paper.

SUMMARY

In accordance with a first aspect of the present invention, we provide a holographic security device comprising at least first and second diffractive image generating structures recorded in respective sets of substantially non-overlapping regions of a record medium, the regions of one set being interleaved with regions of the other set, whereby both interleaved regions are substantially non-visible to the unaided eye, whereby the holographic security device generates two or more optically variable images viewed from separate and/or overlapping viewing directions around the device and seen by tilting the device, and whereby each particular optically variable image in a given viewing direction is generated by the diffractive image generating structure associated with one set of interleaved lines, characterised in that the first diffractive image generating structure has been formed to have a diffuse diffractive replay and the second diffractive image generating structure has been formed to have a non-diffuse or specular diffractive replay.

The invention addresses the visual limitations associated with the previously described interleaving methods, wherein the two or more interleaved optically variable generating structures have been fabricated by the same origination mastering process and exhibit the same diffractive characteristics, by extending the interleaving principle to cover an image switch between two optically variable generating structures whose diffractive replay characteristics are fundamentally. To provide such a device requires us to record within the same resist master, two precisely interleaved image generating structures which exhibit complementary optically variable effects—each having been fabricated within the resist by separate and technologically distinct origination methods, for example optical interferometry and electron beam lithography.

WO2007083140 (published after the priority date of this application) describes a similar process but the individual interleaved regions are not substantially non visible to the naked eye.

DETAILED DESCRIPTION OF THE INVENTION

Before proceeding to discuss the various aspects of the invention we find it convenient to briefly clarify the meaning of the terms specular and diffuse reflection. To begin with specular reflection is the perfect mirror like reflection of light from a surface, in which the light from a single incoming direction (a ray) is re-directed into a single outgoing direction. More particularly the incoming (incident) and outgoing (reflected) rays make the same angle with the surface normal (e.g. i=r). This is in contrast to diffuse reflection, where the incoming light is redirected over a broad range of angles.

The first diffractive image generating structure characterised by a diffuse diffracting structure is typically generated by optical interferometry and is preferably a Benton Rainbow Hologram, The second generating structure characterised by a non-diffuse or specular diffracting structure is typically generated using dot-matrix interferometry, lithographic interferometry or e-beam lithography.

Although linear are the preferred form for the interleave structures, a similar effect may be generated by using integrated arrays of structures comprising geometrical shapes such as squares or hexagons. In this case each structure is generated within each geometrical shape and then the shapes are arranged as a close pack array of for example hexagons and squares. Each individual part of the array will peferably not be discernible to the naked eye.

To aid in the understanding of the invention, the division between the diffuse and non-diffuse diffracting structures is illustrated schematically in FIG. 1. The different Image Components (IC's) exhibited by the security device of the current invention are formed from either a diffuse or non-diffuse (specular) diffracting structure generating a Specular Image Component (SIC) and a Diffuse Image Component (DIC). The SIC is further divided into a Specular Electronic Image Component (SEIC) and a Specular Optical-Interferometric Image Component (SOIC). The SEIC is typically generated by a process of electron beam lithography. However it should also be noted that non-diffusely (i.e. specular) diffractive image generating structures may also be generated by the process of optical interferometry and such IC's will be referred to as SOIC's. An SOIC is preferably generated using dot-matrix interferometry or lithographic interferometry. Likewise the DIC can be further divided into a Diffuse Electronic Image Component (DEIC) and a Diffuse Optical-Interferometric Image Component (DOIC). In the case of the DIC, a DOIC is the most preferred image component and is preferably generated from a Benton Rainbow Hologram.

In this description, a SIC is comprised of a complex 2D arrangement of pixels or structure elements, wherein each pixel or structure element contains an elementary grating structure—that is to say the grating structure is defined by:
1. A singular grating periodicity (typically defined in lines per mm)
2. A singular grating orientation or azimuthal angle.
3. A singular grating phase—which determines at a microscopic level exactly which points in the x,y plane the grating relief experience its peak and troughs (maxima and mimima)

We find it convenient to refer to the combination of grating periodicity, orientation and phase as defining the grating function.

Typically these structure elements are sufficiently small to be non resolvable to the naked eye with dimensions ranging from 50 micrometers down to 5 micrometers. They are most typically circular, or rectangular in shape in conventional recording systems, but can also take the form of regular or irregular polygons.

When collimated light of a particular wavelength is incident on the SIC, then each structure element within the active image area will diffract or re-direct this light in a specific direction as determined by its singular grating function and the diffraction equation. Expressed slightly differently, light from a single incoming direction (a ray) is redirected by the grating structure element into a single outgoing direction according to the geometrical laws of diffraction*. By analogy with the definition of specular reflection off a mirror we find it convenient to define diffraction by a single function grating structure as specular or non-diffuse diffraction. This terminology is further strengthened by the fact that conventional (i=r) reflection is a special case of the diffraction condition wherein for optical smooth or polished all diffraction orders above the zero order become vanishingly weak—i.e. conventional reflection is zero order diffraction with all other terms being in practical terms negligible.

By comparison within this description or teaching, the image area within a DIC is not resolvable into an arrangement of small pixels or structure elements each containing a singular grating function but instead each point on the surface will have diffractive surface relief which is the superposition of different grating functions—that is to say that grating structures which differ in periodicity and or orientation and or phase. When a ray of incident or incoming light hits any point on the image area within a DIC, then it will be diffracted or redirected into a series of outgoing rays travelling in different directions. The grating structure within the DIC has the effect of converting light from a single incoming direction into multiple outgoing directions—therefore by anology with the terminology for reflection off an optically rough surface, we find it convenient to define diffraction off a relief structure containing a multiplicity of grating functions and most especially a multiplicity of grating orientations and periodicities as diffuse diffractive replay. It should be appreciated that effective representation of 3D depth or parallax effects such as is observed within a hologram requires the presence of a complex diffuse diffractive grating structure, wherein within certain limits there is more continuous variation in grating function within the grating superposition.

It also important to appreciate within the context of this teaching that limited diffusion type effects can be provided within a SIC by the technique of spatial multiplexing. For example suppose at some surface point on a DIC, the diffractive surface relief contains a multiplicity of grating functions wherein the diffusing effect was generated by variations in the azimuthal angle for each image component between the ranges $\emptyset\ 1$ and $\emptyset\ 5$. It should be recognised that within a typical DIC (such a conventional Benton rainbow hologram) there is a continuous incremental progression in the azimuthal angle between the two values, and this is what is responsible for the smooth continuous parallax effects exhibited in conventional holograms. Applying the technique of spatial multiplexing, someone skilled in the art would record five structure elements wherein the first structure element has the a single grating function with azimuthal angle $\emptyset\ 1$, the second structure element the azimuthal angle $\emptyset\ 2$, the third grating structure the azimuthal angle $\emptyset\ 3$, the fourth grating structure the azimuthal angle $\emptyset\ 4$ and finally the fifth grating structure the azimuthal angle $\emptyset\ 5$. Thus we see that the point of complex grating structure in the DIC has been replaced with a grouping of 5 structure elements. A direct consequence of this is that the provision of diffusion effects with a SIC significantly reduces the resolution—indeed in this very limited case of grating functions the resolution is reduced by a factor of five along one dimension. Suppose we were trying to simulate within a SIC the continuous parallax effects provided by the most typical of DIC's a conventional hologram. To create in the observer's eye continuous uninterrupted parallax or depth movement may require a grouping of say 25 structure elements. Suppose the structure element had a size 10 μm×10 μm corresponding to a resolution of 100 pixels/mm—then if the grouping was done along one axis, as is most convenient from a recording perspective, then the effective artwork resolution along that axis would drop to a mere 4 pixels/mm.

It is for this reason that a SIC is not recorded so as to simulate optically variable diffusion effects such as 3D parallax but instead is designed to provide moving grating effects e.g. kinematic artwork movement effects as described in Optical Document Security, Renesse, Rudolf L. Van, ISBN 0-89006-619-1, chapter 9 and later described in this specification.

Electron beam lithography is a relatively new technique which has been developed to generate holographic generating structures and is seen as an alternative technique to the well known method of optical interferometry. Thus, it is widely recognised within the optical industry, that diffuse white light holography (as exemplified by the Benton Rainbow Hologram) and electron beam lithography represent the two most complementary DOVID recording methods or technologies. The Benton Rainbow Hologram being best suited to providing overt or macro image effects, which are easily recognised and interpreted by the layperson—such effects being 3D and stereographic effects (i.e. changes in perspective and parallax generated by models and multiplex photography) and simple full symbol image switches. Whereas electron beam lithography is best suited to generating complex transformational line effects and high-resolution micro graphical effects (i.e. alphanumeric characters and symbols with dimensions less than 50 micrometers).

Also optical-interferometric techniques such as Benton holography generally is restricted to recording surface relief microstructures that are symmetric in the plane of dispersion. The use of electron beam lithography, wherein the detailed profile of each individual diffraction grating is exposure-etched out of the recording medium, permits the generation of non-symmetric relief profiles which produce positive and negative diffractive orders of unequal brightness.

We have realised, however, that the interleaving of a diffuse holographic generating structure and a non-diffuse or specular holographic generating structure can generate quite distinct images and optical effects.

By holographic generating structures this description means structures that generate graphical images by the mechanism of diffraction of light.

In optical interferometry the original pattern has been generated by a holographic process of optical interference, whereby within the manufacturing stage of this origination process at least one component of the image may contain a rainbow hologram and where optionally at least one holographic intermediate hologram or H1 is used which enables at least one component of the resulting image optionally to contain true holographic depth effects if desired (as associated with 2D/3D or 2D rainbow holograms as known in the art). This description also applies to surface 2D structures generated by the above holographic process but constrained to lie substantially on the image plane of the final device and with the preferred option of being constrained in the range of spatial frequencies contained therein (i.e. viewing angle of replay). This forms in the limiting case of extreme constraint a holographic structure substantially similar in visual performance to a pure diffraction grating structure but subtlety distinct in that on a microscopic level the microstructure will have been formed by a holographic projection process and may contain evidence of recorded laser generated speckle pattern structures.

The interleaving of two holographic generating structures allows the creation of an optical microstructure which upon illumination generates two or more overlapping images which can be observed by eye from at least two separate viewing directions around the device. Although this is possible using conventional holographic techniques by recording overlapping holographic images with the optical microstructure pertaining to each image simply superposed in the area of overlap, the resulting composite microstructure will always replay each component of the image with a reduced efficiency or brightness compared to a single diffractive structure. In fact, the presence of overlapping diffractive microstructures always results in a structure with a reduced optical diffraction efficiency compared to a single diffractive structure due to the presence of overlapping microstructure and always tends to witness the presence of the second "ghost" image in the overlap area due to medium saturation and a reduction in optical efficiency. This is due to the presence in the overlapping areas of two very different holographic structures with different orientations to the carrier grating frequencies. This limits the overall optical efficiency and observed brightness of the holographic image, which is particularly disadvantageous in bank note holograms where there is a severe reduction in perceived brightness after application of the hot stamping foil to the bank note. For this reason, this type of hologram is rarely used on a bank note application and instead a diffraction grating based image would often be preferred due to the retention of greater diffraction efficiency after application.

This aspect of the invention thus allows the creation of an optically variable device with two or more very clear and bright graphical overlapping holographic images located in the same area of the device but visible at different orientations, which importantly retains a high diffraction efficiency when applied as a hot stamping foil on a bank note despite the disruption to the microstructure caused by the paper roughness and fibre intrusion. This enables the efficiency and apparent brightness of each of the observed overlapping images to be comparable to that of a single holographic image device. The images also appear "solid" to the eye.

This is achieved by ensuring that each small area of the device only contains the holographic microstructure pertaining to one graphical image enabling a much greater microstructure holographic grating modulation to be achieved without visibly degrading the second graphical image by the appearance of a "ghost image" of the first graphic which would otherwise appear due to medium saturation in areas of superposed microstructures. Importantly this allows the master holographic embossing shims and holographic hot stamping foil to be over modulated to compensate for structure relaxation and degradation due to paper roughness on application, so that the final optical microstructure on the paper is at peak diffraction efficiency.

Preferably, this is achieved by subdividing the two or more graphical images into an interleaving grid of fine lines (linear or curved), whose structure could be regular but is preferably more complex and at a scale size of 25-100 μm (although larger line widths are possible for larger graphic images although at 250 μm the line widths are becoming straightforwardly discernible to the unaided eye). The use of the very fine line widths of size 25-50 μm or 25-75 μm ensures that the line patterns within the images are non discernible to the unaided eye (the limiting resolution of the eye is around 20 μm, for a high contrast image, typically reduced by a factor of 3 or 4 for a lower contrast pattern to c. 80-100 μm).

Any point on the image surface contains microstructure pertaining to only one graphic image, this microstructure being a holographic diffractive microstructure. In the current invention the first holographic generating structure is a diffuse diffracting holographic structure which has been preferably created by the interference of a diffused wave front that recreates the graphic image and a second coherent beam. A very important property of this structure is that this area is truly a holographic structure containing a range, albeit small, of spatial frequencies of microstructure and also containing a recorded speckle pattern characteristic of a holographic microstructure and also where each small area of the device replays a controlled predetermined solid core of ray angles, albeit of limited viewing angle, as opposed to a pure specular diffraction grating where each point of the image would replay a pure point replay.

A preferred embodiment of this device is where the holographic structure is formed as a surface relief for manufacture by embossing and casting processes and for application to documents of value as surface relief structures. This could be, for example, in the form of a label or applied as a hot stamping foil or potentially directly embossed into a layer on the surface of a document where this technique will provide a major improvement in performance for such devices when they are being created holographically. However, other forms of holographic recording known in the art, such as reflection holograms, could also be used.

The holographic images may be visible at different viewing angles and could present views of different objects or different views of the same object.

Typically, at least one of the holographic generating structures is in the form of a blazed holographic structure.

In a typical device the interleaved fine line structures are of a size below the normal size resolution of the unaided human eye.

In some embodiments of the device at least one interleaved holographic image component may contain true holographic depth. In some embodiments of the device at least one interleaved holographic image component may contain a 3D effect from a model.

Further advantages of the general concept of interleaving holographic generating structures are set out in more detail in WO-A-99/59036 incorporated herein by reference.

In theory, the two holographic generating structures could be independently formed in respective dies or the like which are then impressed in turn into a record medium such as a photoresist. However, the need for very high accuracy to achieve interleaving means that in practice this is very difficult to achieve.

Thus, in accordance with the second aspect of the present invention, we provide a method of forming a holographic security device, the method comprising a) providing an undeveloped photoresist layer on an electrically conductive layer;

b) forming a first holographic generating structure having a diffuse diffractive replay in the undeveloped photoresist layer; c) forming a second holographic generating structure having a non-diffuse or specular replay in the undeveloped photoresist layer; and c) thereafter developing the photoresist layer, wherein the first and second holographic generating structures are recorded in respective sets of substantially non-overlapping regions of the photoresist layer, the regions of one set being interleaved with regions of the other set, whereby both interleaved regions are substantially non-visible to the unaided eye, whereby the holographic security device generates two or more holographic images viewed from separate viewing directions around the device and seen by tilting the device, and whereby each particular holographic image in a viewing direction is generated by the holographic generating structure associated with one set of interleaved regions.

With respect to the formulation of the resist layer this should (for the development chemistry used):

exhibit a positive response to both the optical and electronic exposures or a negative response to both the optical and electronic exposures We therefore need to exclude photo-resists wherein electron exposure can simultaneously generate both a positive response and negative response (cross-linking). Next an intermediate layer or layers is located between the photo-resist layer and a substrate layer. The intermediate layer(s) act primarily as the conductive layer but may also act as an absorbing anti-reflection coating to suppress internal reflections within the resist plate. The conductive layer dissipates electronic charge that accumulates on the resist surface during the electron beam recording process. The conductive layer preferably extends to the edges of the resist on at least two predetermined sides. In one preferred embodiment a partially transparent layer of a metal such as Chrome (deposited typically by the process of vacuum deposition) is used as the conductive layer—such a layer fulfilling both the functional requirements of an anti-reflection layer and that of a conducting layer transferring electrical charge deposited on the resist through to ground. Alternatively, the chrome layer may be provided with an anti-reflective coating such as chromium oxide or silicon dioxide between the chrome layer and the photoresist.

In another embodiment two intermediate layers may be provided wherein the first intermediate layer in contact with the resist may be comprised of a non-metallic coating with surface resistance less than 10 M$\Omega$/sq. Such coatings can be created by dispersing Antimony tin oxide or Carbon Black in an organic binder.

Or a commercially available coating such as ESPACER 100 (supplied by Showa Denko). Such coatings being applied to the substrate by conventional spin coating. The second intermediate layer being a coating which absorbs 'blue' light as ferrous oxide or Ebonite black (supplied by Canning).

The security device could be used as formed but typically will be used to form a die or shim to enable copies of the security device to be formed using conventional embossing techniques.

Typically, step (c) will be carried out after step (b) but the reverse is also possible.

Holographic security devices according to the invention can be used for a wide variety of purposes to add security to documents and articles. As already mentioned, they are particularly suited for use with documents or articles having relatively rough surfaces being made of paper and the like but can also be used with other materials such as plastics. Examples of articles which can be secured using such devices are passports, passbooks, tickets, permits, licences, financial transaction cards including cheque guarantee cards, charge cards, credit cards, cash withdrawal cards, electronic funds transfer cards, service entitlement cards, personal or article identification cards, prepayment cards, telephone cards, variable e.g. decrementing value cards, bonds, fiscal documents, bank notes, cheques including travellers cheques, vouchers, brand identification labels, tamper resisting or indicating labels.

The device is conveniently constructed in the form of a transfer assembly such as a hot stamping foil enabling it to be transferred onto a document or article to be secured. In that situation, typically the device carries a heat sensitive adhesive (or pressure sensitive adhesive) on its exposed surface.

Further security of an article, such as a document of value, to which the device can be applied, is achieved by including the device in a generic pattern with a multiplicity of the devices.

BRIEF DESCRIPTION OF THE DRAWINGS

An example of a holographic security device and a method of forming that device in accordance with the present invention will now be described with reference to the accompanying drawings, in which.

Figure 1:
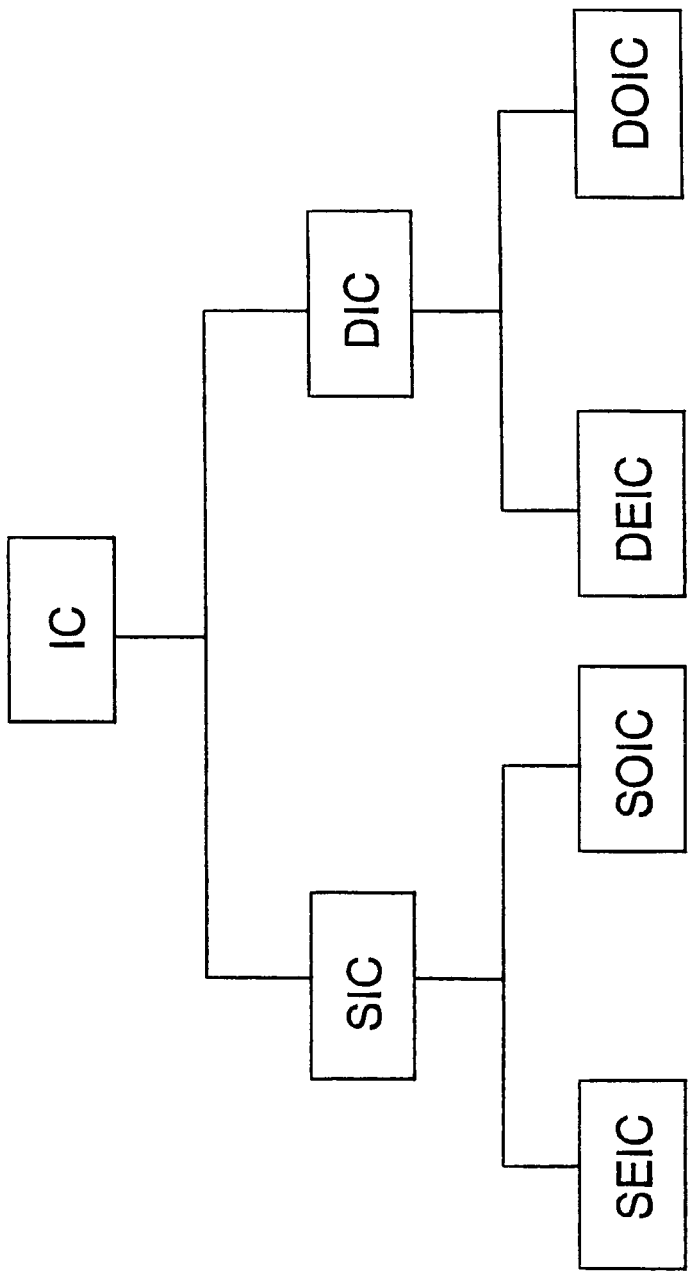
FIG. 1 is a flow chart showing the different types of Image Components.
Figure 2:
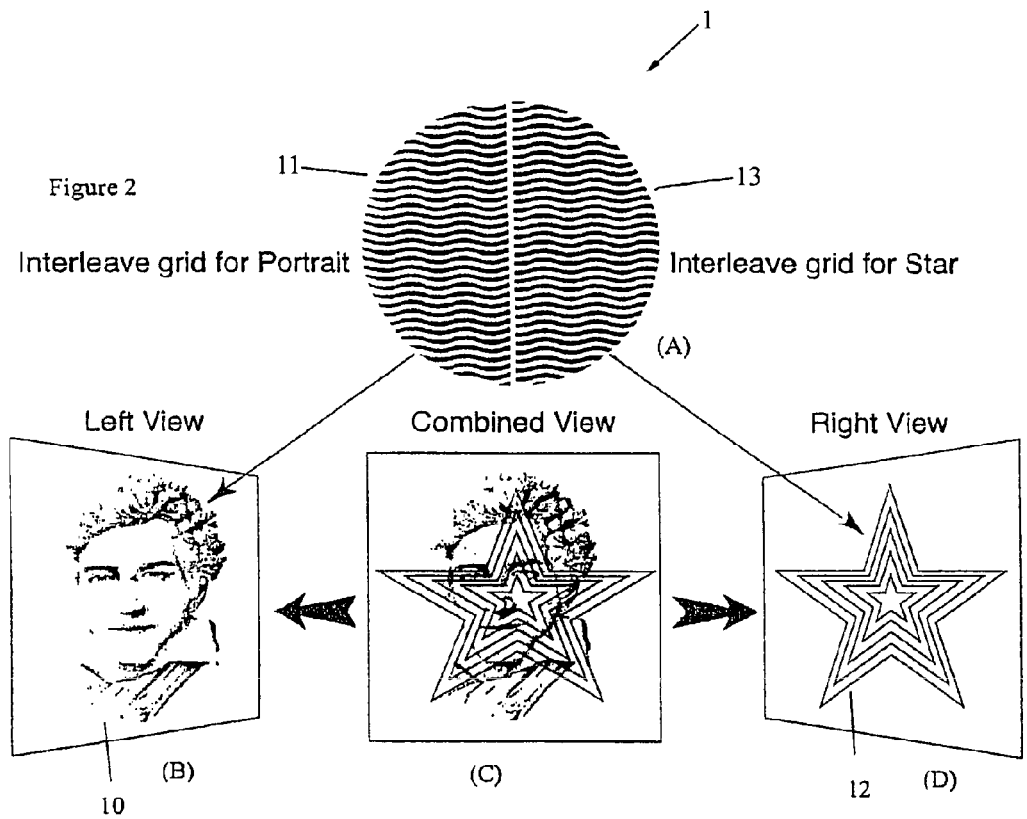
FIGS. 2A-2D illustrate an enlarged schematic view of the device (FIG. 2A) and the appearance of the device when viewed at different tilt angles (FIGS. 2B-2D)

The device 1 shown in FIG. 2 comprises two IC's 10,12, a first IC 10 illustrating a portrait which is generated by a diffusely diffractive holographic image generating structure formed using optical interferometry, that is a DOIC (Diffuse optical-interferometric image component) and a second symbol 12 in the form of a 5-pointed star formed by a non-diffuse or specular diffractive image generating structure, such as those formed by electron beam lithography, that is a SEIC. The respective surface relief structures 11,13 pertaining to the portrait 10 and the >star= 12 respectively in the form of mutually interleaved regions defining periodic grid patterns are shown in FIG. 2A, wherein the regions shown as black contain the respective DOIC and SEIC structures and these are shown separated laterally for clarity. In reality the two sets 11,13 are interleaved with each grid line of one structure between two grid lines of the other structure.

The periodicity of each grid pattern can (dependent on the desired visual effect) be provided in the range of 20-200 μm, but typically it will be in the range 80-120 μm, most preferably 80-100 μm this being substantially non-visible to the naked eye.

The origination method (i.e. the method used to create the initial hologram) used to generate the relief grid pattern for the DOIC 10 is described in detail in WO-A-99/59036. The generation of the e-beam grid pattern for the SEIC uses the conventional raster process used by e-beam lithography machines.

It should be appreciated that the recording of two interleaved periodic grid patterns requires very precise registration between DOIC and SEIC components. Specifically for the periodicities outlined above we require registration tolerance in the X & Y axis of around 0.1-10 micrometers. Such a tolerance requirement is best achieved using the process and datum pin system described below.

In the preferred embodiments, the relief structures present in the DOIC & SEIC will have predetermined grating pitches and more particularly grating orientations (e.g. different azimuthal angles). This will provide an angular channel switch between the DOIC and the SEIC on horizontal, vertical, or rotational tilting.

FIGS. 2B-2C show a particular example wherein the DOIC 10 is recorded so as to replay in the left hand view (FIG. 2B), whilst the SEIC >star= symbol 12 is recorded so as to replay in the right hand view (FIG. 2D), both appearing in the transitional position (FIG. 2C).

Alternatively the DOIC 10 can be recorded so as to produce a centre view, whilst the SEIC >star= symbol 12 is recorded so as to replay on 90 degrees rotation.

A key security benefit that the invention offers over the devices of WO-A-99/59036, relates to the fundamentally different replay characteristics associated with a diffusely diffractive image generating structure and a non-diffuse (i.e. specularly) diffractive image generating microstructure. A hologram microstructure which, at any point on the device, is typically comprised of a coherent superposition of different grating functions replays light in a different manner, whereas an electron beam relief at any point on the device is defined by a single grating function and replays light in a highly directional (i.e. specular) way. This means a true holographic DOVID will have a very different visual appearance to a specular e-beam originated DOVID.

A direct consequence of this is that an overlapping image switch being an DOIC and an SEIC is visually more distinctive and striking than the corresponding image switch between a first DOIC and a second DOIC.

The different replay characteristics of the diffuse and non-diffuse diffracting structures enable two contrasting images to be replayed which are not possible when interleaving two similar structures either both diffuse or both non-diffuse. The diffuse structure is particularly suitable for presenting pictorial or photo-realistic image types which only appear meaningful when a substantial portion of the image area or picture content is simultaneously replayed or diffracted into the observer's eye. Typically such image types are not explicitly rendered into fine line or dot patterns. Examples of such image types would be portraits or photographs of people, animals, plants or iconic national symbols. In comparison the on-off nature of the non-diffuse or specular structure is more appropriate for geometrical structures and alphanumeric characters which do not have the requirement to have all aspects of the image visible at one time. The non-diffuse structure and particularly those generated by e-beam, can generate very high resolution structures enabling the creation of covert microimages within the security device. In addition to each of the two resultant images/symbols appearing at their different respective viewing angles effected by either tilting or rotating the device, it may be desirable to further differentiate the visual characteristics of the two primary image components by further separating the non-diffuse image component into a series or arrangement of subsidiary image components, wherein each such subsidiary image component has been provided with its particular grating structure such that it replays into a narrow predetermined part of the angular viewing zone on tilting or rotating the device. The objective being to cause the SEIC to exhibit graphical expansion, transformation or kinetic effects.

Figure 3:
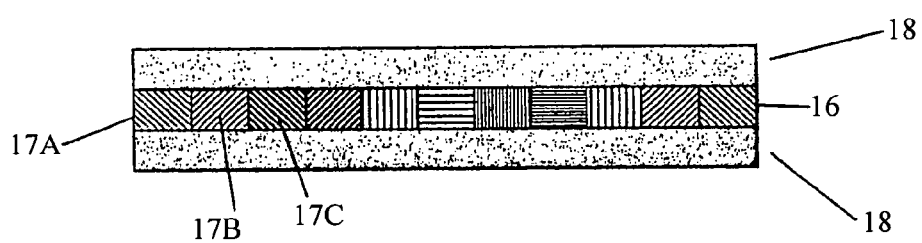
FIG. 3 is a schematic plan of part of a device.

This is achieved by the interleaved grid lines 16 corresponding to the SEIC being subdivided into subsections 17A-17C etc wherein each subsection 17A, 17B and 17C has a separate grating orientation and/or periodicity. This is shown schematically in FIG. 3, with the DOIC grid lines indicated at 18. It should be noted that the angle of the hatching within the arrangement of the subsections 17A,17B which comprise the SEIC, does not indicate the orientation of the grating structure within that sub-section. It simply indicates that each subsection may have a different grating constant (pitch) and or orientation. In this manner the perception of movement is generated from the SEIC. The two visible images can be related by design and the kinematic nature of the SEIC can be used to highlight the DIC. In a further example the SEIC may be part of or complete the DIC for example the specular image may form a geometric shape or outline inside which the DIC is positioned.

Figure 4:
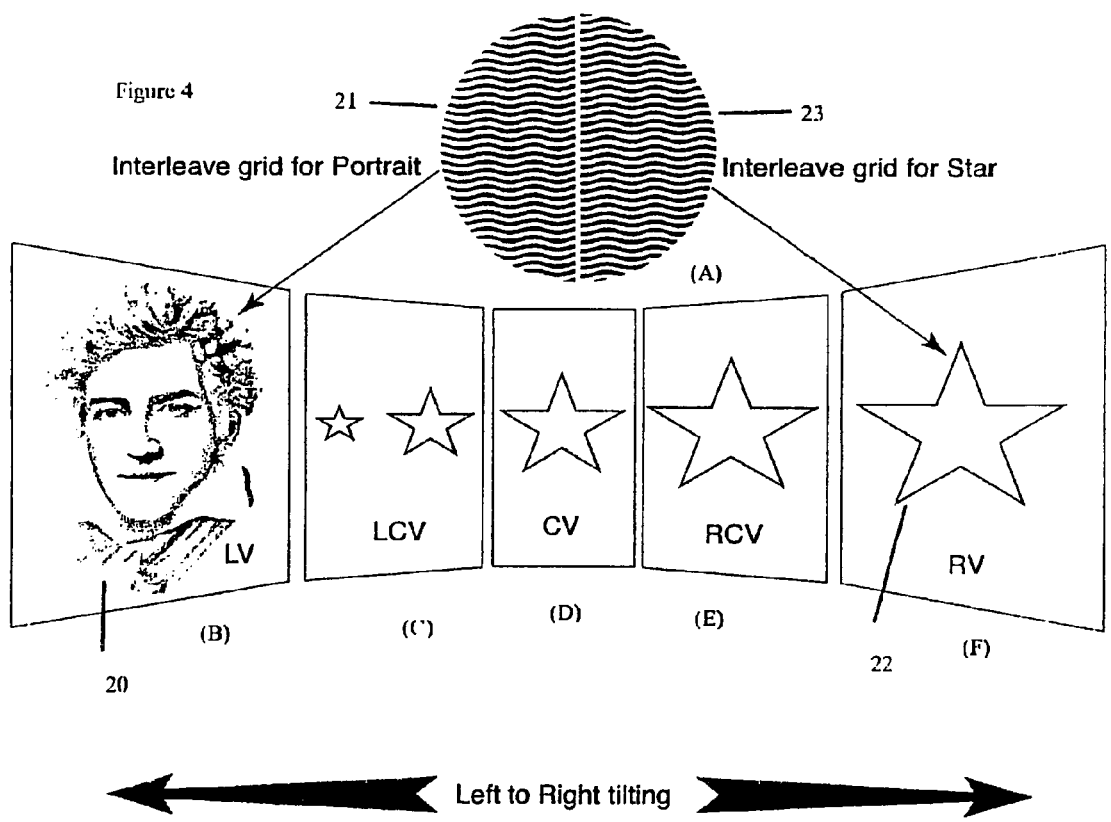
FIGS. 4A-4F illustrate an enlarged schematic view of a second example of the device and the appearance of the device when viewed at different tilt angles.

The device illustrated in FIG. 4 comprises two IC's, a DOIC 20 illustrating a portrait and a SEIC 22 in the form of a 5-pointed star formed by a non-diffuse or specular diffractive image generating structure, such as those formed by electron beam lithography. The respective surface relief structures 21,23 pertaining to the portrait 20 and the >star= 22 in the form of mutually interleaved regions defining periodic grid patterns are as shown (laterally separated) in FIG. 4A. In this example the lines 23 forming the SEIC 22 have been subdivided into sections where each subsection has a separate grating orientation such that a kinematical effect is achieved in relation to the five-pointed star. FIG. 4B shows a particular example wherein the DOIC 20 is recorded so as to replay in the left hand view, whilst the SEIC >star= symbol 22 is recorded with multiple grating structures so as to replay as a large star in the extreme right hand view (FIG. 4F) and then diminish in size on right to left tilting of the security device (FIGS. 4E to 4C) before disappearing completely and being replaced by the portrait in the extreme left hand view (FIG. 4B).

Figure 5:
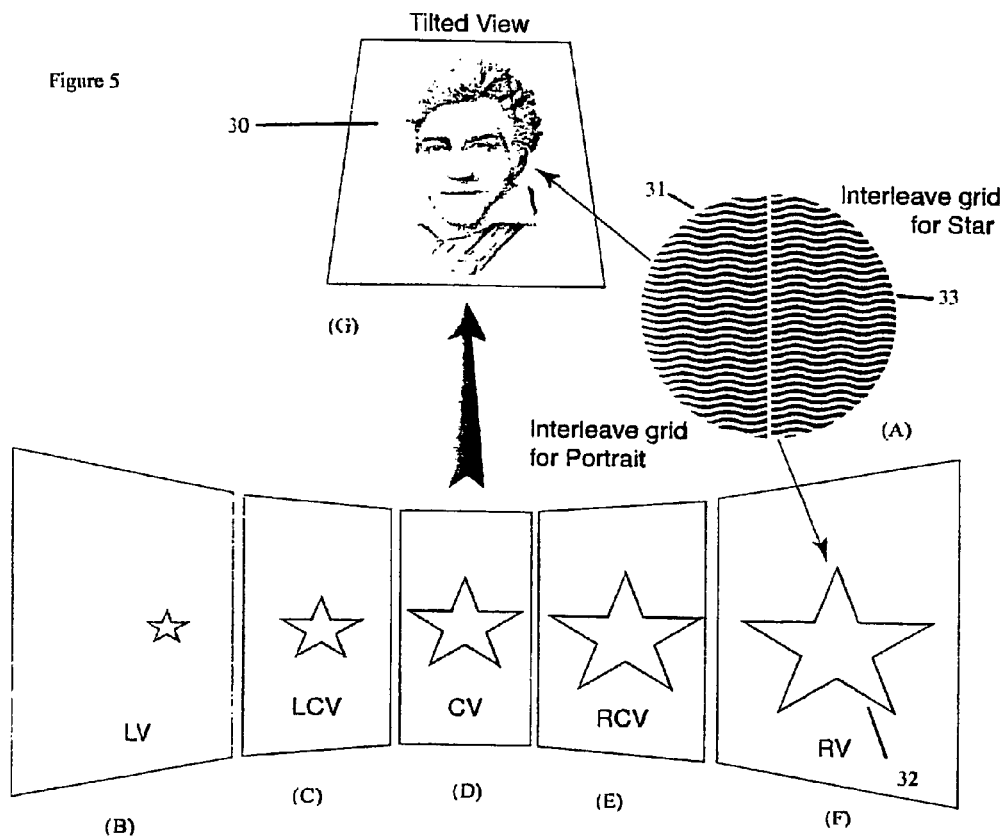
FIGS. 5A-5G illustrates an enlarged schematic view of a third example of the device and the appearance of the device when viewed at different tilt angles.

FIG. 5 illustrates a further embodiment where the security device comprises two IC's, a DOIC illustrating a portrait 30 and a SEIC in the form of a 5-pointed star 32 formed by a non-diffuse or specular diffractive image generating structure, such as those formed by electron beam lithography. The respective surface relief structures 31,33 pertaining to the portrait 30 and the >star= 32 are in the form of mutually interleaved regions (FIG. 5A) defining periodic grid patterns as in the previous embodiment. In this example the lines 33 forming the SEIC 32 have been subdivided into sections (not shown) where each subsection has a separate grating orientation such that a kinematical effect is achieved in relation to the five-pointed star (FIGS. 5B-5F). In this case the DOIC 30 is recorded so as to replay in the tilted view (FIG. 5G) achieved by vertical tilting of the security device, whilst the SEIC >star= symbol 32 is recorded with multiple grating structures so as to replay as a large star in the extreme right hand view and then diminish in size on right to left tilting of the security device.

The two examples illustrated in FIGS. 4 and 5 show the striking and highly memorable nature of the security device of the current invention which would not have been practical to achieve without the combination of a DIC and a SIC in an interleaved array.

It will be appreciated that the same or different methods (e beam or optical interferometry) may be used to originate the DIC and SIC.

It should also be noted that the device is not limited to two interleaved IC's. For example the device could comprise three or more interleaved structures to generate further striking effects. For example the device could present a first image component DOIC1 in left view, a second image component DOIC2 on tilting horizontally to right view and a third image component SEIC on vertical tilting.

Some processes for fabricating a photoresist containing the DOIC and SEIC in register will now be described.

The basic process for fabricating a suitable photo-resist plate 43 (the H2 resist master) comprises first vacuum depositing a thin film (10-20 nm) of Chromium 40 (FIG. 6) on a quartz or soda lime glass substrate 41, taking care to ensure that the chromium layer 40 extends fully to the edges of the glass substrate 41. The Chromium layer provides the functions of a conductive layer and an absorbing anti-reflection coating. Onto this is then coated a suitable photoresist layer 42 with a thickness which may vary in the range of 200 nm to 20000 nm, depending on the depth and type of surface relief required. Though for the case of a conventional DOVID operating in the first order of diffraction the preferred thickness will fall within the range of 500 nm to 2000 nm.

Experimental work has shown that a suitable positive photo-resist is the Microposit S1800 series supplied by Shipley which contains the following solvent: propylene glycol monomethyl ether acetate. The resin used in this photoresist is novolac based and the photoactive compound belongs to the group of diazonaphtoquinone (DNQ) sulfonates. An appropriate developer which delivers a good contrast factor γ for both the optical and electronically generated surface relief is Shipley's Microposit 303 at a dilution in water of 1 part to 6.

Figure 6:
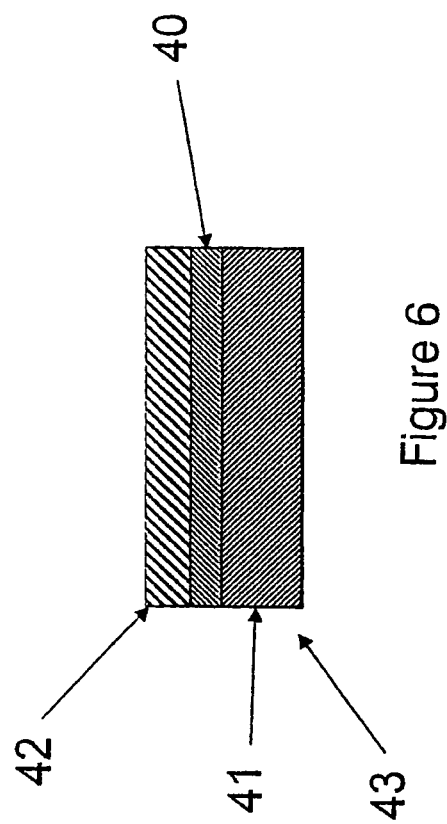
FIG. 6 is a schematic cross-section through an example of a photoresist master plate.

A preferred method for recording or generating (i.e. originating) the DOIC, namely a Benton transmission Rainbow Hologram, within the photo-resist plate 43 (the H2 master) of FIG. 6 will now be described.

Figure 7:
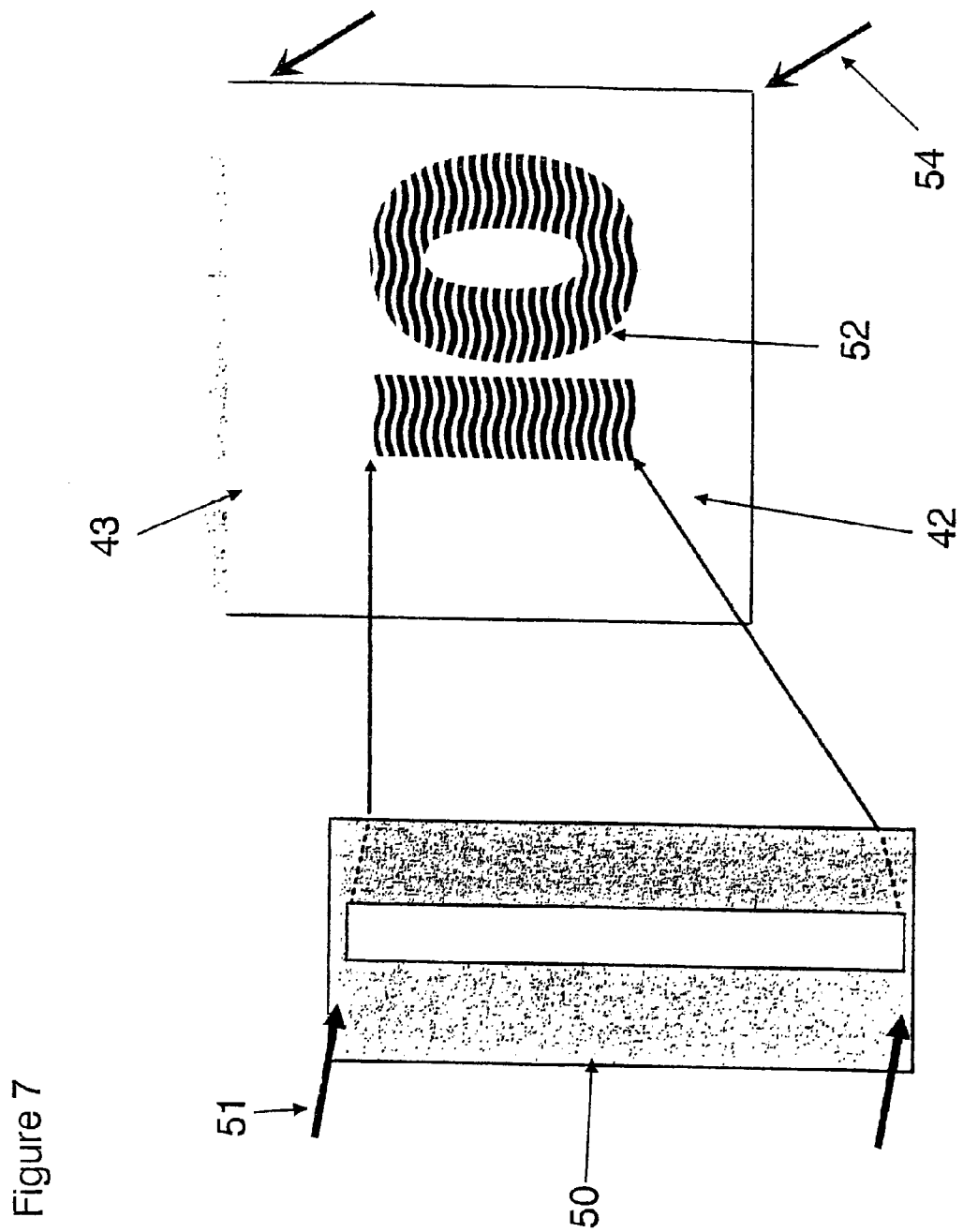
FIG. 7 illustrates, in plan and cross-section, successive steps in a conventional method for forming embossing shims.

The first stage of this process is to record, within an intermediate transmission hologram (the H1) 50 (FIG. 7), the artwork components that comprise the DOIC (in this case numeral 10). The artwork components can be, for example, a sculpted model or a layered planar arrangement of transmissive artwork masks (e.g. 'glass transparencies'). The fundamentals of this process are well known in the art as the Benton H1-H2 holographic recording process. Following the recording and development of the intermediate transmission hologram 50 (the H1), the next stage is to re-illuminate said H1 50 with a conjugate 51 of the reference beam used to record it. Illumination of the H1 50 by its conjugate reference 51 causes it to transfer or project a real holographic image 52 (the H2 object beam) of the previously recorded artwork elements. The focal plane of the H2 object beam is then allowed to fall on the photo-resist plate 43 and overlaps the reference beam 54 (the H2 reference beam) to record a holographic interference pattern, which is spatially defined by the H2 object beam. A schematic illustration of the H2 recording process is shown in FIG. 7. The DOIC is at this stage a non-visible latent image. In order to visualise the image component it is necessary to develop the plate 43. In the case of a positive resist (such as Shipley S1800) the solubility of the resist in developer increases with exposure energy (the relationship being linear in the preferred operating zone) hence the bright interference fringes (interference maxima) generate the troughs in the periodic relief patterns whilst the dark fringes (minima) correspond to the 'peaks' in the periodic relief.

Figure 8:
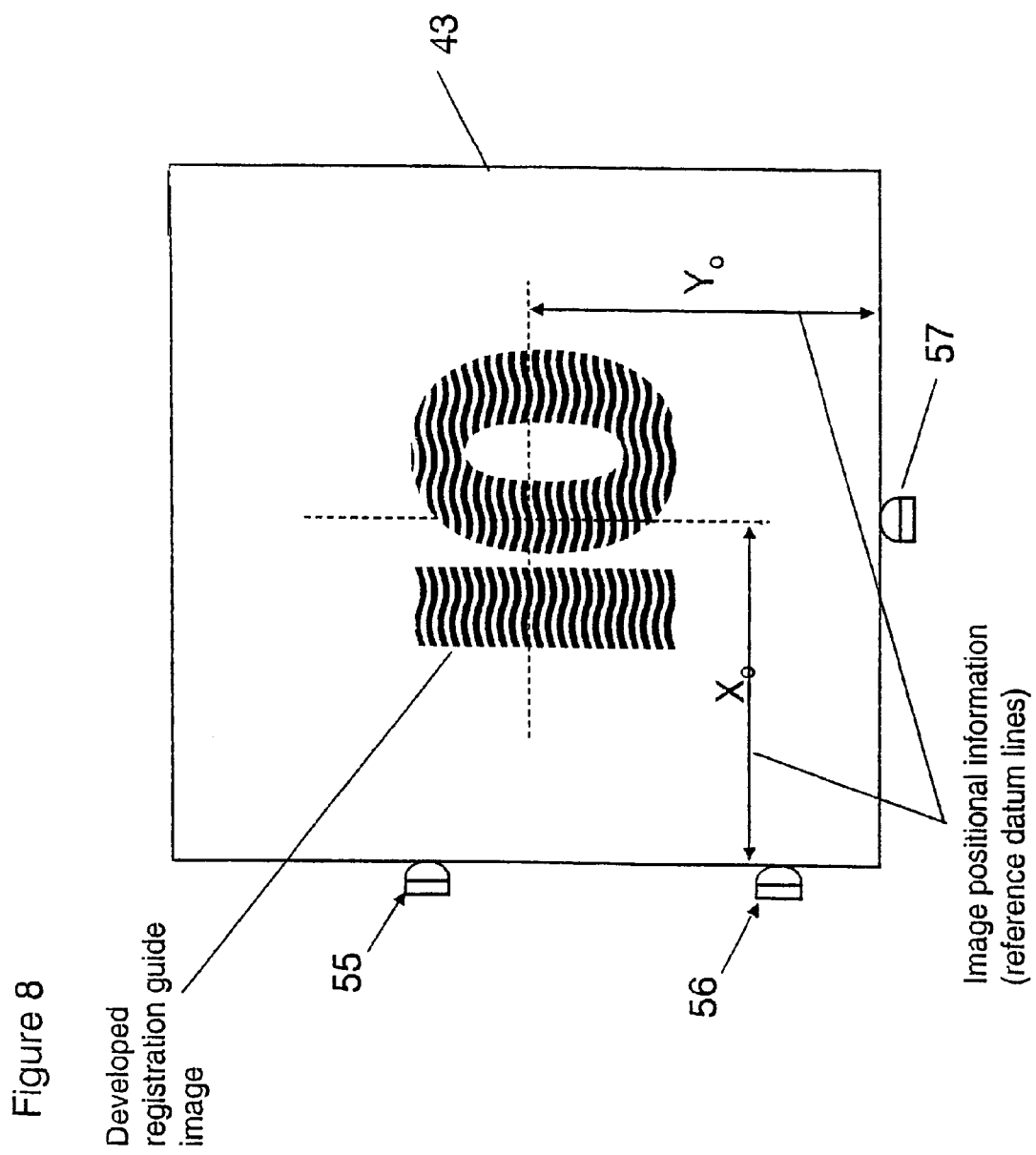
FIG. 8 illustrates the way in which an optical image is located on a photoresist plate.

During the recording of the combined security device it is advantageous that the location of the H2 object 52 is precisely referenced to datum surfaces or points on the photo-resist master 43 which will remain invariant of dimensional changes in the photo-resist plate (such as variations in size, thickness or orthogonality of the sides). Specifically it is preferred that the plate holder have three locating pins 55-57 (FIG. 8), two of which 55,56 are located in the horizontal plane and one 57 in the vertical plane, with each pin making a point or radiused contact with the respective sides of the H2 resist master 43. In such a system the projected H2 object is spatially referenced to these three contact or datum points.

Using the process described above, a set-up plate is generated by exposing a first resist plate to one or more DOIC's located in predetermined positions with one or more predetermined energies. This plate is then developed in an appropriate resist developer to convert the latent DOIC's into visible relief images. The coordinates (see FIG. 8) of each DOIC, or more particularly associated registration datum marks, lines or cross-wires recorded adjacent to each DOIC are then determined by measuring their distances from the respective datum points or edges by means of a travelling microscope or some other technique such as optical scanning of the plate. Through this process we determine the precise position of the image with reference to the registration datum lines (Xo,Yo), see FIG. 8, which are provided on the H2 master 43.

Figure 9:
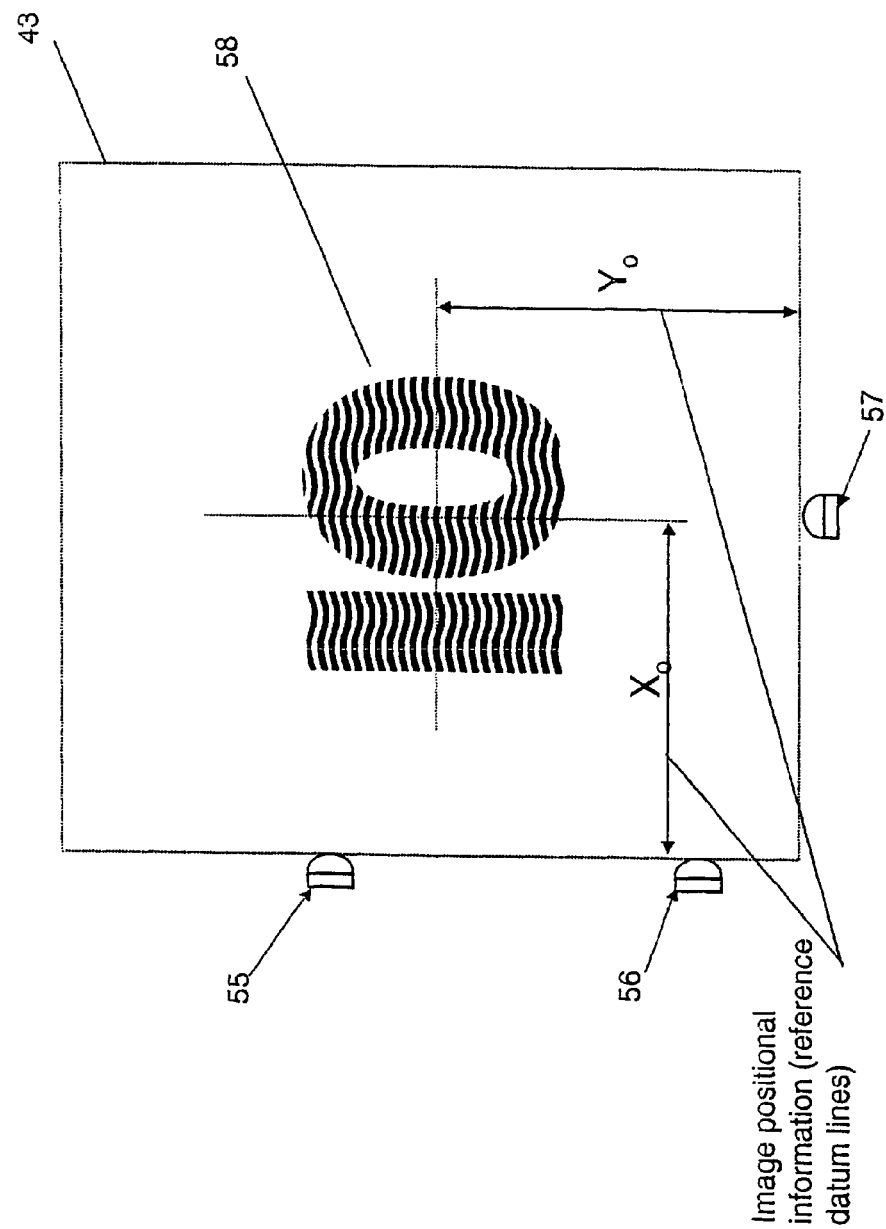
FIG. 9 illustrates a photoresist plate exposed to an optical image component prior to development.

Following the generation of the set-up plate the next step in the process is to record one or more H2 resist plate masters with said DOIC components, wherein these additional photo-resist plates will subsequently be recorded with the second electron-beam image component (SEIC). Each additional H2 photo-resist master is recorded with at least one OIC recording and preferably at least two to three DOIC recordings in the same predetermined positions and with the same predetermined positions as the H2 set-up plate. Because of the arrangement of three pin datum pins 55-57 provided in the resist plate holder, the position or X, Y coordinates of the virtual DOIC in each additional H2 resist master (see FIG. 9) will match the $X_0, Y_o$ coordinates of the DOIC in the set-up to within 50 microns or better. It should be noted that in contrast to the set-up plate there is no processing or development of these H2 photo-resist masters in between the recording of the DOIC and SEIC.

It should be appreciated that although we have described a method for originating the DOIC based on the Benton H1-H2 recording process, the inventive concept is not limited to that origination technique. The inventive method could be readily adapted such that the DOIC has been generated by the process of optical interference lithography, wherein transmission masks are placed in intimate contact with the resist and the combination irradiated by the light interference pattern generated by two overlapping laser beams one of which will be diffuse in nature having previously propagated through a diffusing substrate or reflected off a diffusing surface.

Upon completion of the recording phase for the DOIC, the resist masters will then be located in a second plate holder pertaining to the electron beam machine, wherein the second plate holder is required to be geometrically equivalent to the first (DOIC) plate holder as regards the arrangement and position of the locating or datum pins. It should be noted that the datum pins 55-57 are conductive, preferably metal, and they should have a conductive path to an electrical earth. For example the conductive datum pins 55-57 will typically be fixed in a plate holder made from stainless steel which is electrically earthed. Consequently when the H2 resist master 43 is inserted into the plate holder and located firmly against the conductive datum pins 55-57—the conductive metal layer 40 located between the resist layer 42 and the glass substrate 41 will make sufficient electrical contact with the conductive datum pins 55-57 to ensure that the electronic charge that is deposited in and accumulates on the resist layer during the electron beam exposure process will be conducted away to earth. Thus critically preventing the build up of electrostatic charge that can distort and degrade the recording of the SEIC.

Considering next the recording of the SEIC, the first step of this process is to utilise the X-Y optical image coordinates determined from the set-up plate in order to select the appropriate electron beam exposure or 'write' coordinates for the SEIC. Previous exposure trials will have established proximity electron-beam exposure energy for the SEIC to ensure that its surface relief amplitude evolves at the same rate as the OIC surface relief when the H2 master 43 containing the combined image (DOIC and SEIC) is chemically processed. As an example for a resist such as Shipley S1800, it has been found that a preferred exposure energy for recording the DOIC will lie between 10 mJ/cm$^2$ and 20 mJ/cm$^2$ with a corresponding electron beam exposure energy in the range 10-30 µC/cm$^2$ and especially in the range 15-25 µC/cm$^2$.

Figure 10:
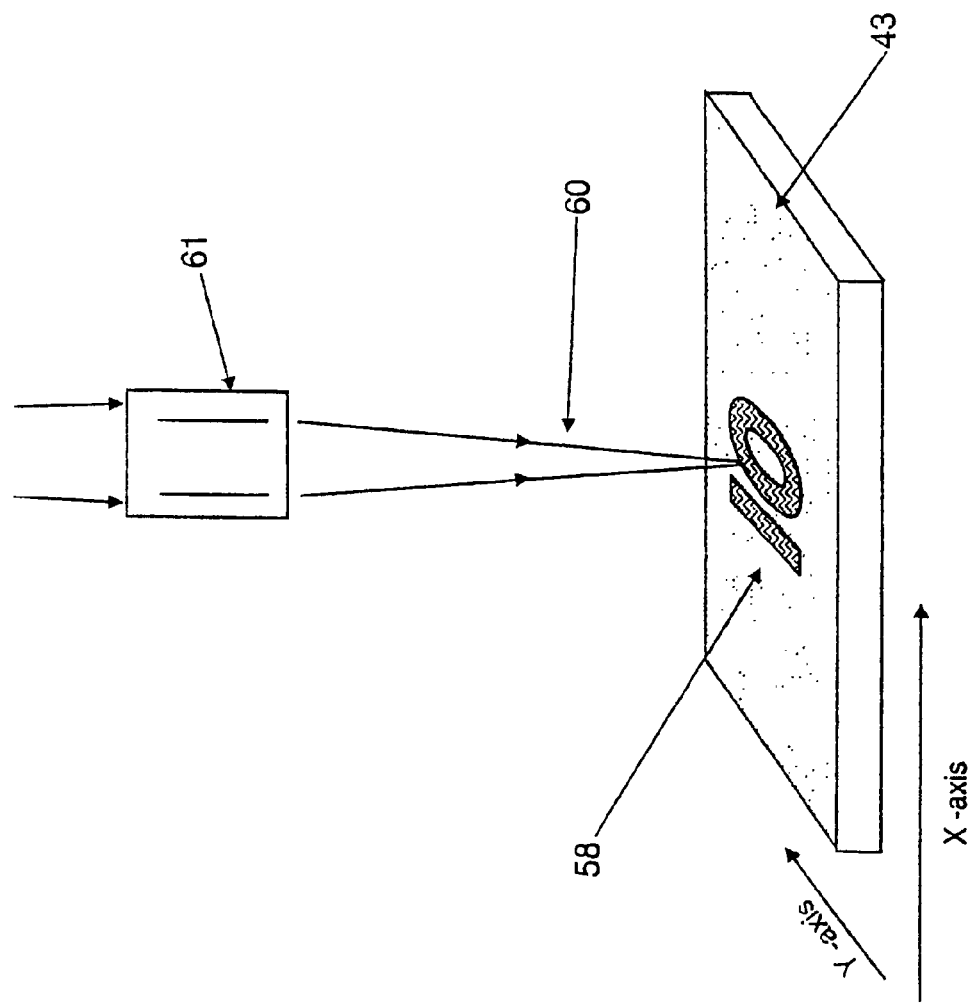
FIG. 10 illustrates a photoresist plate with an undeveloped electron beam image.

When the optimal exposure coordinates and energy have been selected a first H2 master 43 (containing the latent DOIC 58) then undergoes the electron beam recording or writing process by exposure to a focussed beam of electrons 60 from a source (not shown) via a focussing system 61 thus generating the latent SEIC as shown schematically in FIG. 10. The H2 master 43 is fixed against said datum pins in the previously described electron beam plate holder.

It is current industry practice to use e-beam lithography to originate an SEIC comprised not only of first diffractive structures (grating periodicity ≤5 µm) but also of zero order structures (rectangular profile and grating periodicity ≤5 µm). E-beam lithography could also be used to originate an SEIC comprised of very coarse structures (periodicity ≥10 µm) which behave according to the geometric laws of reflection and refraction.

Following exposure of the SEIC, the resulting H2 resist master 43 is then chemically processed or developed to generate a visual image of the desired brightness, thus generating the completed H2 resist master. Now if on inspection of this first H2 master, it is determined that either: further improvements in positional registration between DOIC and SEIC are required, or the relative diffraction efficiency of the EIC and OIC is not optimal, then a second H2 resist master can be recorded with the exposure coordinates or the exposure energy modified accordingly.

Thus far reference has been made to the Shipley S1800 resist, which is the predominant resist used by originators of DOVIDS via optical interferometry techniques. Shipley S1800 resist is a positive working resist in that the solubility (within the linear part of its solubility versus exposure energy curve) increases proportionality with exposure energy. However it has been experimentally determined that the SEIC surface relief, when recorded into a positive resist is not so faithfully replicated as the corresponding DOIC—this contrast being most notable in those graphical components or elements within the SEIC which have dimensions or line widths less than 50 microns and especially less than 20 microns. A typical example of such an SEIC component will be what is known within the optical security industry as diffractive micro-text e.g. alpha numeric characters or indicia with font or character heights less than 200 micrometers. This difference in the relative embossing efficacy of the optical and electronically recorded grating structures is due to the difference in the shape or profile of their respective surface reliefs.

Specifically, grating structures generated by process of optical interference (including those within a hologram, which is typically comprised of a complex coherent superstition of gratings) are essentially sinusoidal in shape or profile. Since the amplitude of the grating profile (ca≤0.1 micrometers) is typically less than a tenth of the grating pitch (normally between 0.7 and 1.4 micrometers), the slopes of these sinusoid gratings will have fairly gentle gradients (typically ≤35° and relief maxima and minima with large radii (>grating pitch). Consequently optical interference gratings are relatively shallow open relief structures, readily replicated by the level of visco-elastic deformation of the embossed lacquer that occurs for typical embossing nip pressures (1-10 Nmm$^{-2}$) and lacquer temperatures (145-175° Celsius).

Conversely electron beam originated structures will be characterised by having a relief structure which in positive resist approximates to a periodic pattern of steep sided rectangular 'binary' pits wherein the base of each pit may be wider than opening at the top due to diffusion and defocus of the electron beam. The faithful replication or embossing such structures is in rheological terms much more challenging in that it requires the embossed lacquer to be in a state of viscous flow rather than in a visco-elastic state and to prevent any subsequent relaxation of the embossed structure it is necessary that the lacquer be rapidly cooled to below its glass transition temperature, as it exits the embossing nip.

In order to reduce the technical challenge associated with the efficient replication of electron beam surface relief microstructure two approaches can be taken:

The first is to use a negative resist, characterised by having photochemical behaviour which is the reverse of a positive resist in that the effect of exposure by actinic radiation (400-460 nm) is to generate a chemical cross-linking or photo-polymerisation effect which causes the exposed areas to become increasingly insoluble with exposure energy. A suitable negative resist would be one with a low contrast ratio ($\gamma<4$).

An example of a negative resist is AZ(r) nLOF™ 2000 Photoresist supplied by Clariant—AZ Electronic Materials. This contains PGMEA (2-methoxy-1-methylethylacetate) as the solvent. The resin cross-links when exposed.

Since a sinusoid profile is symmetric under inversion, the use of a negative resist will have little impact on the embossing characteristics of surface relief recorded by the process of optical interference. However using a suitable negative photo-resist in electron beam lithography allows the generation of more 'open' grating structures with a more trapezoidal or sinusoidal profile which are more inherently suitable for the embossing process.

Figure 11:
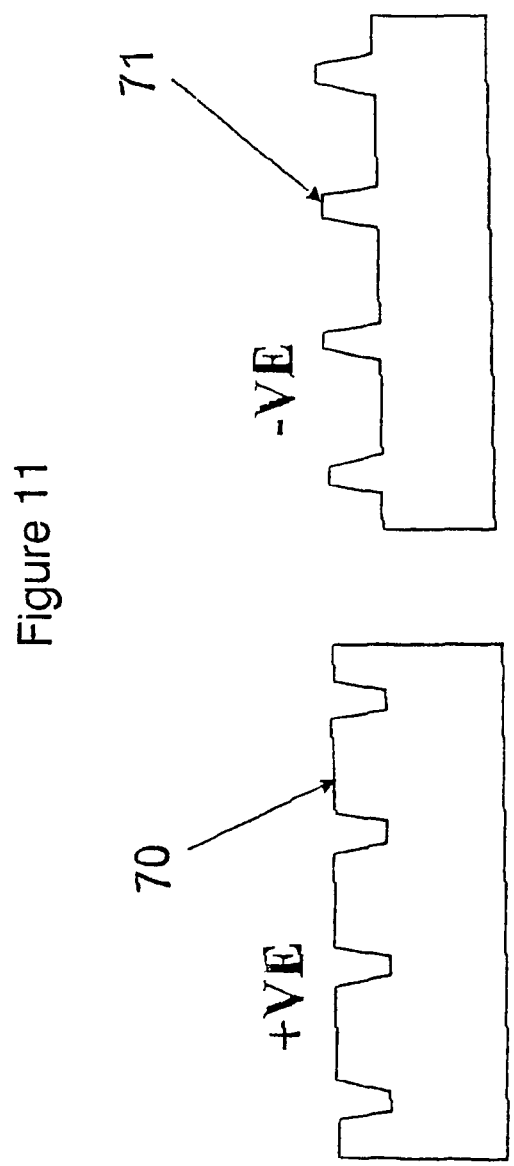
FIG. 11 illustrates a conjugate embossed pattern.

As an alternative, we propose a second novel method for addressing the relief profile issues associated with electron beam gratings for the case where it is preferred to work with a particular positive resist due its optimal combination of sensitivity, contrast and resolution. The proposed solution is to conduct the foil embossing process (that is to emboss into a lacquer or similar material provided on a carrier film) with nickel stampers (usually referred to within the industry as embossing shims) which are the conjugate or negative of the H2 resist master. The use of a negative stamper means we emboss or impress into the hologram or OVD layer a relief structure 70 which is conjugate or reverse of that present within the resist master 71 as illustrated in FIG. 11.

To understand what affect the use of negative or conjugate embossing shims have on the origination process, it should be noted that in a conventional DOVID (whether that be in the form of a hot-stamped foil or a tamper evident label) the observed diffractive image is identical to that present within the H2 resist master.

Figure 12:
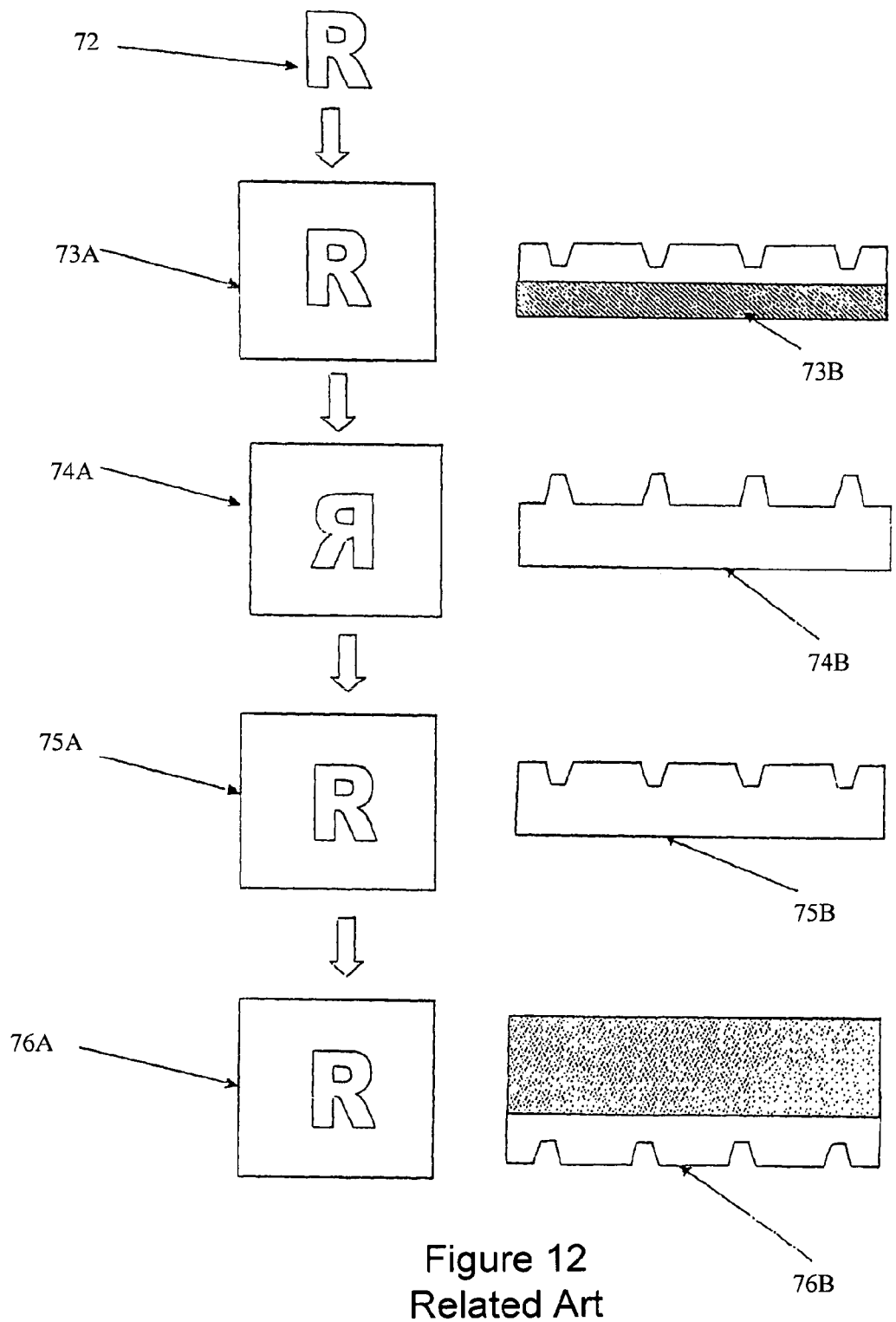
FIG. 12 illustrates, in plan and cross-section, successive steps in a conventional method for forming embossing shims; and, FIG. 13 is similar to FIG. 12 but illustrating an example of an alternative method for producing an embossing shim according to the invention.

For purpose of illustration, consider a DOVID which has an image comprised at least in part of the letter R 72 (FIG. 12). Hitherto it has been the practice within DOVID origination to record a H2 resist master (shown in plan at 73A and in cross-section at 73B) with the letter R appearing with the same sense or orientation. A nickel master 74A,74B is grown from the H2 resist master 73A,73B and then embossing shims 75A,75B are grown from the nickel master 74A,74B. Both the H2 master 73A,73B and embossing shim 75A,75B are referred to as having positive or 'correct-reading' images as can be seen at 73B,75B. Now since in an applied DOVID 76A,76B the embossed surface relief faces into the substrate to which the DOVID is applied, this means the 'hologram' layer must be embossed with a 'correct reading' embossing shim, leading to the electroplating sequence shown of FIG. 12 from which it is clear that the surface relief structure present within the embossing shim 75A,75B will be identical to that present within the H2 master resist 73A,73B (irrespective of whether that photoresist is positive or negative working).

Figure 13:
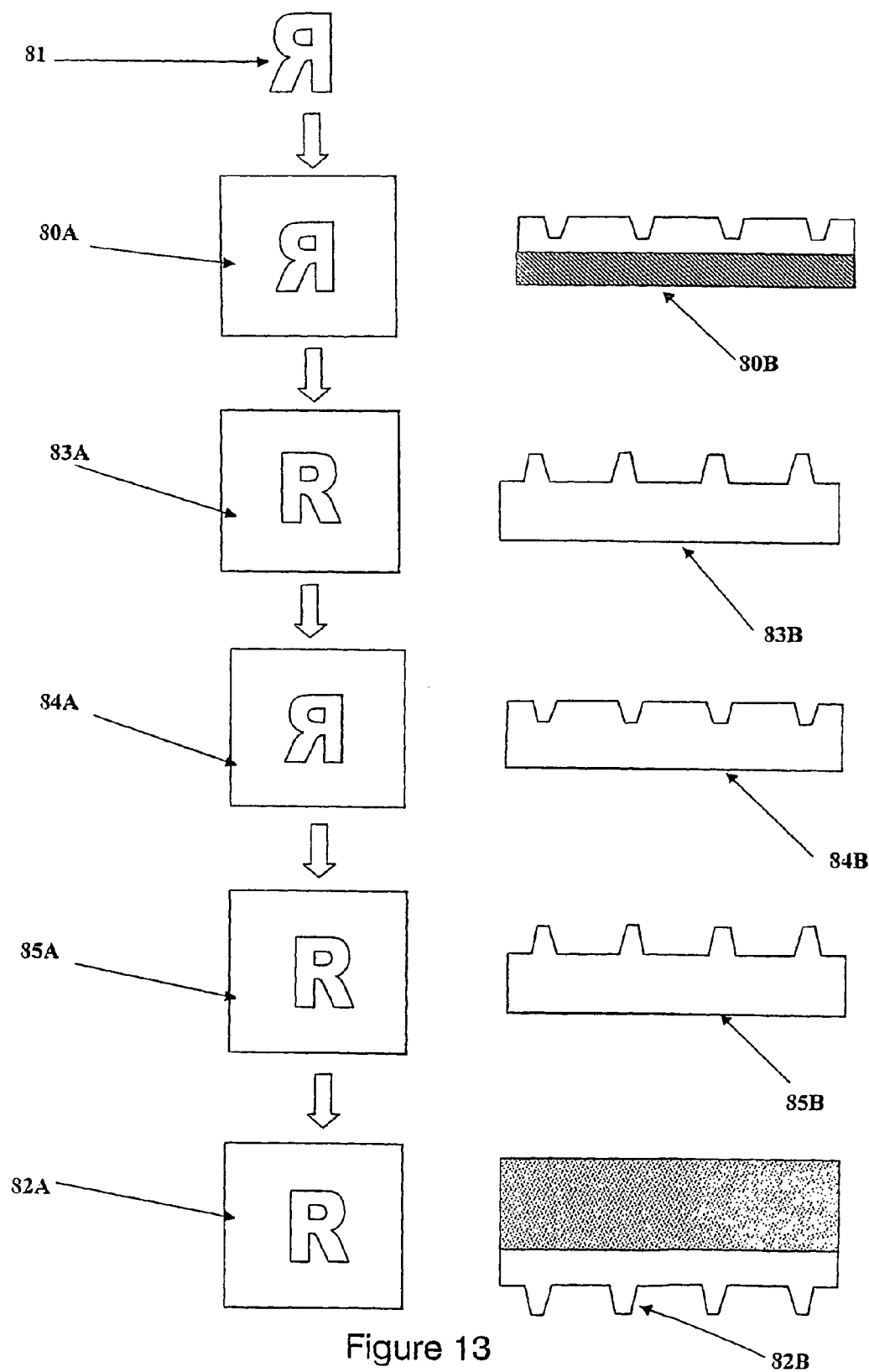

The new approach is to depart from this industry practice by embossing the foil with a surface relief which is the conjugate of that recorded into the H2 resist master. Specifically for the case where a positive photo-resist from an operational perspective is very much the preferred working material, the proposed method will seek to nullify the replication concerns associated with e-beam grating structure recorded in positive photo-resist. The concept is to record the H2 (positive) resist master 80A,80B (FIG. 13) with image artwork 81, which is the conjugate or negative (mirror reverse) of that present in the final applied DOVID 82A,82B as can be seen by comparing 80B and 82B. To avoid confusion by applying term conjugate or the terms positive and negative to both artwork and photo-resist we shall refer the term conjugate artwork as 'wrong-reading'. FIG. 13 shows the process for delivering our requirement, wherein we begin by originating a H2 resist master 80A,80B wherein the artwork 81 for both the OIC and the EIC are recorded 'wrong reading' into the positive photo-resist. This wrong-reading H2 resist master 80A,80B is first vacuum coating with silver to be made conductive, and is then processed according to the electroplating sequence shown in FIG. 13 by successively growing two nickel masters 83A, 83B;84A,84B and then the embossing shims 85A,85B such that we generate embossing shims 85A,85B with 'correct reading' artwork but which have microstructure which is the conjugate of that present in the H2 master 80A,80B comprised of positive resist. In effect the embossing will fremform a microstructure perspective be equivalent to that generated by H2 master comprised of negative resist thus generating a DEIC which is more readily embossed or replicated.

Alternatively and more generally, the non-diffuse structure could also be generated optically by a conventional pixel based dot-matrix system or interferential mask lithography wherein both the overlapping coherent light beams which generate the optical interference are necessarily non diffuse plane or spherical light waves. In such cases the SEIC is replaced by an SOIC. The choice of whether to use electron beam lithography or optical interferometry to generate the non-diffuse image component will be determined by the scale of artwork resolution required within the non-diffuse image component. Specifically e-beam lithography enables the creation of high resolution artwork elements up to 250,000 dpi (e.g. covert micro-graphical features) wherein the dot-matrix system enables artwork with a resolution of up to 1500 dpi to be created for a conventional system and 3000 dpi for a pixel based system. Interferential lithography enables the creation of artwork elements with a resolution of up to 10000 dpi

The invention claimed is:

1. A holographic security device comprising at least first and second diffractive image generating structures recorded in respective sets of substantially non-overlapping regions of a record medium, the regions of one set being interleaved with regions of the other set, whereby both interleaved regions are substantially non-visible to an unaided eye, whereby the holographic security device generates two or more optically variable images viewed from separate or overlapping viewing directions around the device and seen by tilting the device, and whereby each particular optically variable image in a given viewing direction is generated by the diffractive image generating structure associated with one set of interleaved lines, wherein the first diffractive image generating structure has been formed to have a diffuse diffractive replay and the second diffractive image generating structure has been formed to have a non-diffuse or specular diffractive replay.

2. A device according to claim 1, wherein the regions are linear.

3. A device according to claim 2, wherein the regions are curved.

4. A device according to claim 1, wherein the regions are formed by hexagons or squares.

5. A device according to claim 1, wherein each diffractive image generating structure is formed as a surface relief.

6. A device according to claim 5, wherein each region has a width in the range 25-100 microns.

7. A device according to claim 1, wherein each diffractive image generating structure generates only one holographic image.

8. A device according to claim 1, wherein one or both of the images generated by the first and second diffractive image generating structures are visible at different viewing angles.

9. A device according to claim 8, wherein one or both of the first and second diffractive image generating structures generate holograms defining different views of a same object.

10. A device according to claim 1, wherein at least one of the diffractive image generating structures generates a holographic image made up of a number of graphical image components.

11. A device according to claim 10, wherein the graphical image components are localised on a surface plane of the device as surface relief 2D rainbow holograms.

12. A device according to claim 10 wherein at least one holographic image component contains true holographic depth.

13. A device according to claim 10, wherein at least one holographic image component contains a 3D effect from a model.

14. A device according to claim 1, wherein both diffractive image generating structures generate holographic images exhibiting true holographic depth effects.

15. A device according to claim 1, wherein at least one of the diffractive image generating structures is in the form of a blazed holographic structure.

16. A device according to claim 1, wherein each set of non-overlapping regions is in a form of a periodic grid pattern.

17. A device according to claim 16, wherein the periodicity of each grid pattern is substantially the same.

18. A device according to claim 16, wherein the periodicity is in the range 20-200 μm.

19. A device according to claim 1, wherein the first diffractive image generating structure has been originated by one of electron beam lithography and optical interferometry.

20. A device according to claim 1, wherein the second diffractive image generating structure has been originated by one of electron beam lithography and optical interferometry.

21. A device according to claim 1, wherein the regions defining the second diffractive image generating structure are formed by lines of grating structures in which a periodicity or a pitch of adjacent structures differs.

22. A transfer assembly comprising a carrier and a holographic security device according to claim 1 detachably secured to the carrier.

23. An assembly according to claim 22, wherein the carrier can be detached from the holographic security device by application of heat.

24. A document or other article carrying a holographic security device according to claim 1.

25. A method of forming a holographic security device, the method comprising
a) providing an undeveloped photoresist layer on an electrically conductive layer;
b) forming a first diffractive image generating structure having a diffuse diffractive replay in the undeveloped photoresist layer;
c) forming a second diffractive image generating structure having a non-diffuse or specular replay in the undeveloped photoresist layer; and
d) thereafter developing the photoresist layer,
wherein the first and second diffractive image generating structures are recorded in respective sets of substantially non-overlapping regions of the photoresist layer, the regions of one set being interleaved with regions of the other set, whereby both interleaved regions are substantially non-visible to an unaided eye, whereby the holographic security device generates two or more holographic images viewed from separate viewing directions around the device and seen by tilting the device, and whereby each particular holographic image in a viewing direction is generated by the diffractive image generating structure associated with one set of interleaved regions.

26. A method according to claim 25, wherein step c) is carried out after step b).

27. A method according to claim 25, wherein the electrically conductive layer comprises chrome.

28. A method according to claim 25, wherein step (b) comprises transferring a transmission hologram onto the photoresist layer.

29. A method according to claim 25, wherein step (c) is carried out while the electrically conductive layer is connected to earth.

30. A method according to claim 25, wherein the electrically conductive layer extends to an edge of the photoresist layer.

31. A method according to claim 25, wherein the electrically conductive layer acts as an absorbing anti-reflective layer.

32. A method according to claim 25, wherein the electrically conductive layer is provided with an anti-reflective coating.

33. A method according to claim 25, wherein each set of non-overlapping regions is in the form of a periodic grid pattern.

34. A method according to claim 33, wherein the periodicity of each grid pattern is substantially the same.

35. A method according to claim 33, wherein the periodicity is in the range 20-200 μm.

36. A method according to claim 25, wherein the first holographic generating structure is originated by one of electron beam lithography and optical interferometry.

37. A method according to claim 25, wherein the second diffractive image generating structure is originated by one of electron beam lithography and optical interferometry.

38. A method according to claim 25, wherein the regions defining the diffractive image generating structure are formed by lines of grating structures in which a periodicity or a pitch of adjacent structures differs.

39. A method according to claim 25, further comprising using the security device to form a die or shim.

40. A method according to claim 39, comprising carrying out steps (b) and (c) with reverse reading artwork; growing a first copy from the security device; growing a second copy from the first copy; and growing the die or shim from the second copy.

41. A method according to claim 39, further comprising applying the die or shim to a substrate so as to create a surface relief microstructure in the substrate corresponding to the security device.

42. A method according to claim 41, wherein the substrate comprises a label.

43. A method according to claim 42, further comprising subsequently adhering the label to a security document or article.

44. A method according to claim 41, wherein the substrate is provided on a carrier and is subsequently transferred to a security document or article.

45. A method according to claim 41, wherein the substrate comprises a security document or article.

46. A method according to claim 42, wherein the security document or article comprises a banknote, cheque or travellers cheque, certificate of authenticity, stamp, bond, tax disc, fiscal stamp, secure label, passport or voucher, identity card and the like.

47. A security device formed by a method according to claim 25.

* * * * *